March 9, 1937. C. R. PALMER 2,073,252
TEMPERATURE DISPLAY DEVICE
Filed Dec. 3, 1934 3 Sheets-Sheet 1
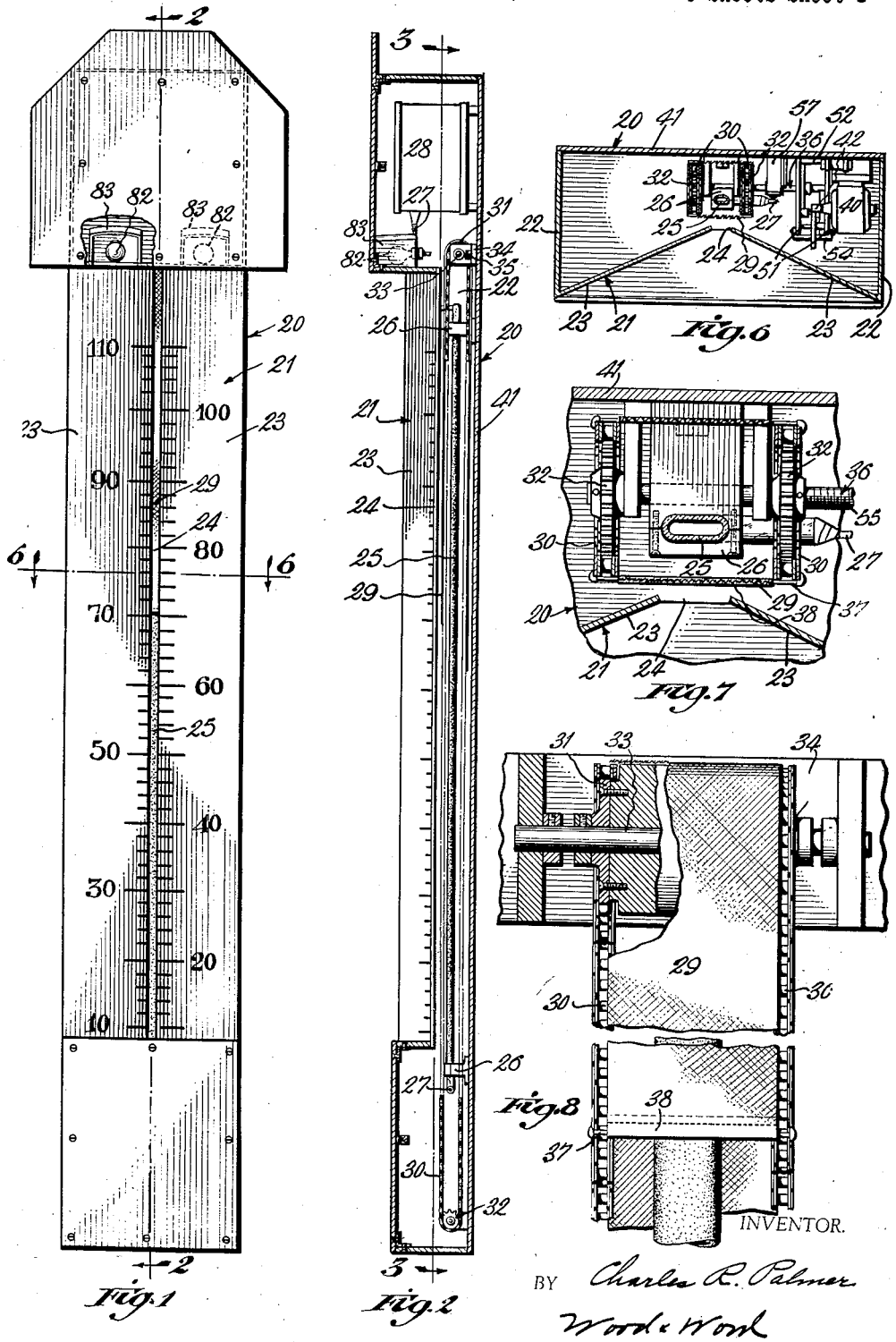
INVENTOR.
BY Charles R. Palmer
Wood & Wood
ATTORNEYS March 9, 1937. C. R. PALMER 2,073,252
TEMPERATURE DISPLAY DEVICE
Filed Dec. 3, 1934 3 Sheets-Sheet 2
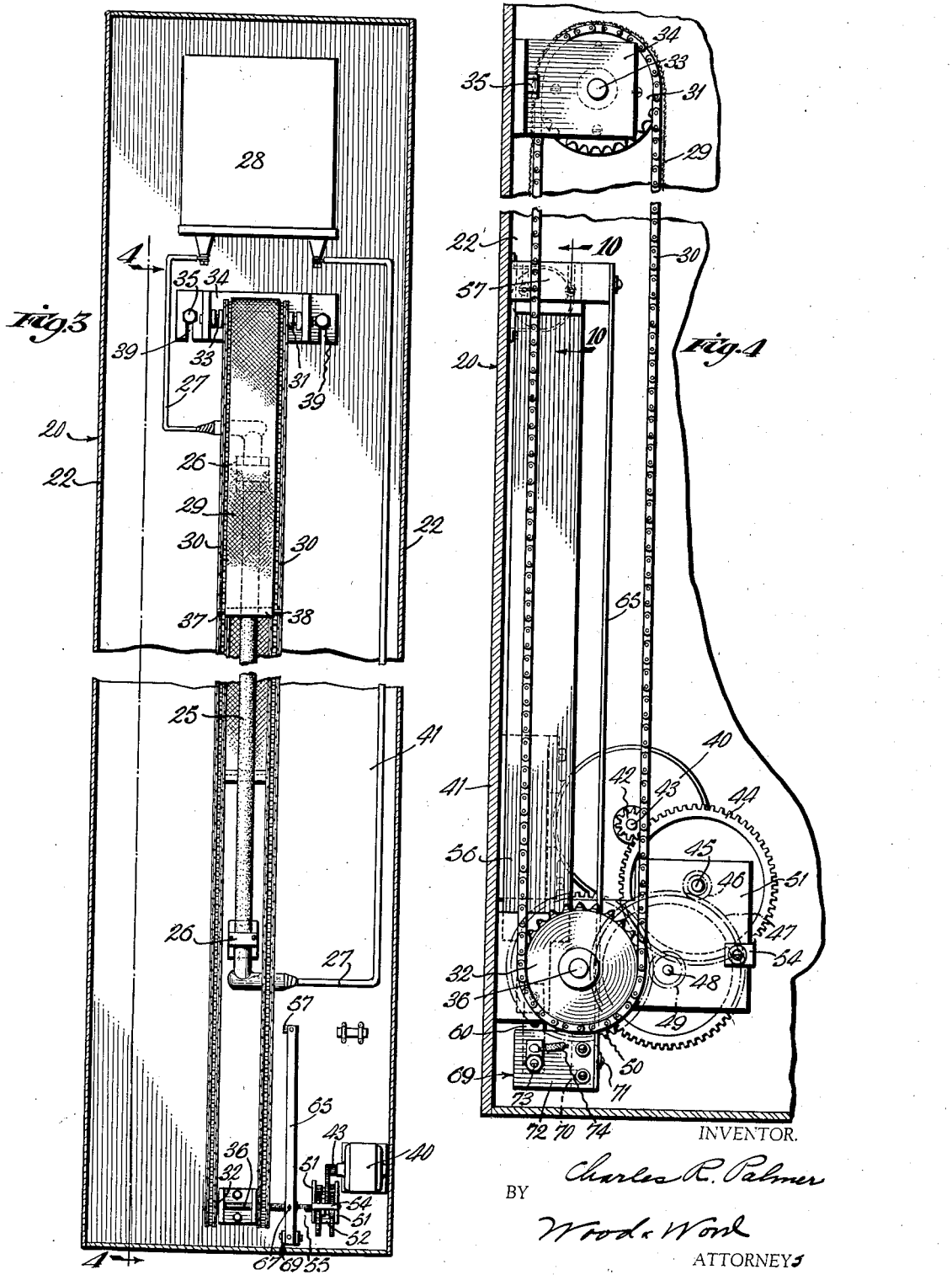
INVENTOR.
Charles R. Palmer
BY Wood & Wood
ATTORNEYS March 9, 1937.   C. R. PALMER   2,073,252
TEMPERATURE DISPLAY DEVICE
Filed Dec. 3, 1934   3 Sheets-Sheet 3.
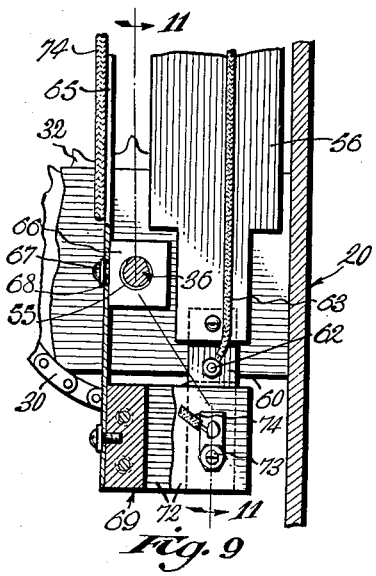
Fig. 9
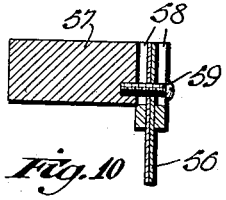
Fig. 10
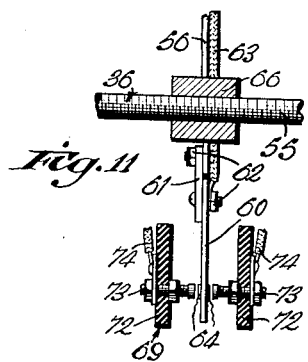
Fig. 11
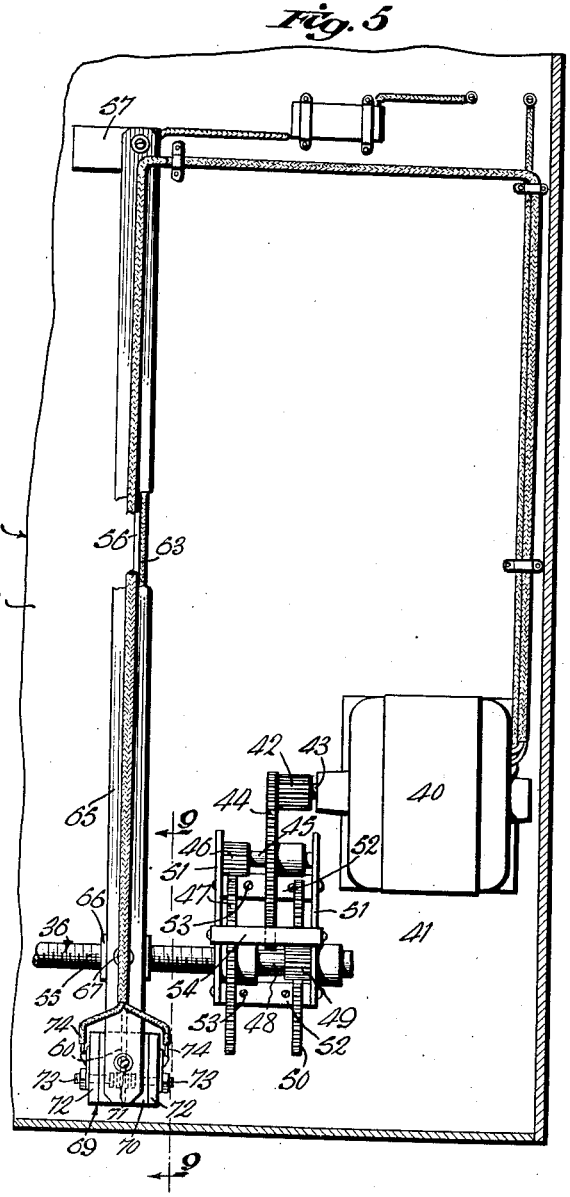
Fig. 5
Fig. 12
INVENTOR.
Charles R. Palmer
BY
Word & Word
ATTORNEYS Patented Mar. 9, 1937

2,073,252

UNITED STATES PATENT OFFICE 2,073,252

TEMPERATURE DISPLAY DEVICE

Charles R. Palmer, Cincinnati, Ohio, assignor to The Palmer Company, St. Bernard, Ohio, a corporation of Ohio Application December 3, 1934, Serial No. 755,691

7 Claims. (Cl. 240—2)

This invention relates to improvements in temperature display or indicating devices, and is particularly directed to a device of this character which can be constructed on a large scale and operated by a thermally sensitive element, and which has a high degree of visibility for long range display purposes, primarily for attracting attention in advertising. The patent to Palmer and Mitchell, No 1,875,757, issued September 6, 1932, discloses and claims a structure which is exemplary of the type of temperature display device herein concerned, and in connection with which the present structure may be properly considered an improvement.

The object of the invention is to provide a dummy thermometer on a somewhat grand scale, animated, as it were, or actuated by a true temperature sensitive instrumentality. The dummy apparatus comprises a conventional thermometer panel and a luminescent tube or the like, organized in semblance of a conventional thermometer, and, preferably the panel is electrically illuminated in contrasting color to the tube. The upper portion of the tube is obscured by a movable screen or shade, rendering visible the highly illuminated lower portion of the tube up to the particular temperature degree registered.

The actual temperature is of course registered by some form of thermally sensitive element. One or another form of instrumentality may be employed, and the positions and variations of the actual thermally sensitive element are translated to the screen of the dummy thermometer, whereby the actual temperature registration is reproduced on the dummy with spectacular and highly visible light effects.

Additionally stated, it is the object of this invention to provide an improved temperature display or indicating device of the above character or type which is clearly visible at great distances; which furnishes an intense and brilliant imitation of the rising and falling mercury column commonly used in the conventional thermometer relative to graduations, that is to say, a device which efficiently displays the temperature in the manner to which the public is accustomed according to the prevailing devices, but more intensely and more sharply delineated at all times; and further which may be entirely operated by electricity if required from a single line connection, utilizing electricity for the purpose of imitating the fluid column and also for the purpose of providing motive power for controlling the temperature indication in relation to graduations by means of a thermally sensitive apparatus.

Accordingly, an instrumentality or apparatus has been constituted comprising a sort of giant temperature display device actuated by a thermally sensitive means so interrelated as to accurately reproduce the temperature indications on a grand scale. Preferably, the reading is rendered more brilliant and highly visible by the contrasting color illuminations of the panel and the luminescent tube. It will of course be understood that the translation of the small dimensional movement of the true mercury column into large dimensional movement of the tube-illumination obscuring curtain is merely a matter of correct mathematical proportioning.

Other objects and further advantages will be more fully apparent from a description of the accompanying drawings, in which:

Figure 1 is a front view of the large temperature display or indicating apparatus of this invention.

Figure 2 is a longitudinal sectional view taken on line 2—2, Fig. 1, further generally illustrating the apparatus.

Figure 3 is a sectional view of the device taken on line 3—3, Fig. 2, showing the internal mechanism thereof.

Figure 4 is a fragmentary sectional view taken on line 4—4, Fig. 3, illustrating the thermostatic control for operating the temperature display means.

Figure 5 is a fragmentary enlarged view taken from Fig. 3, showing the control apparatus in further detail.

Figure 6 is a sectional view taken on line 6—6, Fig. 1.

Figure 7 is a fragmentary enlarged view of a portion of Fig. 6.

Figure 8 is a fragmentary enlarged view of the upper end of the curtain and its support mechanism.

Figure 9 is a sectional view taken on line 9—9, Fig. 5, detailing the construction at the swinging contact end of the thermally sensitive element.

Figure 10 is a sectional view taken on line 10—10, Fig. 4, detailing the mounting of the thermally sensitive element.

Figure 11 is a general view taken on line 11—11, Fig. 9, illustrating the contacts and the actuator therefor.

Figure 12 is a wiring diagram, showing the electrical circuit employed for the control device and curtain operating motor.

In the previously mentioned patent the temperature display or indicating device comprises a large temperature scale containing graduations, a large indicator movable in relation thereto, a motor for moving the indicator, and a thermostatically controlled apparatus for controlling the rotation and counter-rotation of the motor for adjusting the indicator in relation to the scale for displaying the temperature of the environment.

The control apparatus includes a thermally sensitive arm adapted to swing in respective directions responsive to changes in temperature and to assume a given position depending on the temperature, and a control apparatus provided with contacts, one on each side of said thermally sensitive arm. This control apparatus is mechanically connected with the motor to be moved by the rotation of the motor in the path of travel of the thermally sensitive arm, the contacts of the control apparatus relative to which the arm operates being electrically connected to the motor whereby the contact of either by the thermally sensitive arm causes the motor to revolve in a direction tending to disestablish the contact.

The temperature indicator comprises a belt mounted upon rollers, one of which is driven by the motor through reduced motion mechanism and the other of which holds the belt in taut condition.

Now in the present improvement the same control apparatus may be employed if desired for operating the motor and moving the control band or belt. However, in lieu of having a marking or indication on a belt, the belt or band is utilized as a curtain and for this reason is not made endless. An elongated light, preferably a luminescent or gas glow tube, is mounted lengthwise of the scale relative to the graduations thereof. The curtain, the end of which determines the reading, is moved lengthwise up and down in front of this elongated light. The effect given is that of an intensely colored and glowing fluid rising or falling relative to the graduations, as stated, the curtain covering and completely obliterating from view the upper portion of the elongated light. The gas glow tube is highly adaptable for this purpose since it is quite luminous, being not only a good imitation of the conventional fluid but in fact presenting an even better appearance because of the glow emanating therefrom.

More specifically described in relation to the drawings, the device is incorporated in an elongated sheet metal frame or casing 20 fabricated of plates and angle iron strips. The casing is generally rectangular in transverse section. The forward wall 21 of this casing substantially over its entire length is V-shaped, that is to say, inclines from the side walls 22, 22, inwardly. At the base of this forward wall or at the inner ends of the respective inclined portions 23, 23, thereof, a space is provided which forms a vertical slot 24.

The luminescent tube which is best provided in the form of a neon gas filled electrically operated light tube 25 is disposed lengthwise of the slot immediately at the rear thereof and is supported on brackets 26, 26, fastened to the rear wall of the casing. Preferably this tube is of flattened or elongated form in cross section and is frosted for the purpose of diffusing the light. The elongated cross section provides greater tube width and permits the use of a wider slot for a wider column of light.

In a conventional type of luminescent or gas glow tube, the light is more or less concentrated in the center of the tube since the electric current seeks the path of least resistance which usually is a straight line between the electrodes. Any effort to produce a wide column by producing a large tube fails because the light will not fill the entire tube. This is particularly true if the tube is oval shaped or flattened elongated as shown. Accordingly, the glass as stated is frosted, this being done by etching or sand blasting either inside or out so that the light will be diffused and the tube will appear illuminated throughout its entire length. If sand blasting is used it is preferred not to frost the portions which have to be worked in the flame since this makes the glass apt to crack. However, the portions which have to be worked in the flame are at the end of the tube so that they can be clear glass without interfering with the general diffusion produced by the frosting.

The respective ends of this tube are connected by electric wires 27, 27, to a transformer 28 mounted within the top of the casing. The curtain 29 moved in front of the tube and longitudinally thereof is in the form of a belt or band mounted on endless chains 30, 30, one at each side thereof. These chains 30, 30, are mounted on pairs of sprocket wheels 31, 32, respectively rotatably supported at the upper and lower ends of the casing. The forward runs of the chains pass in a plane between the tube 25 and the forward wall 21 of the casing defining the slot 24 so that the curtain belt carried thereby is interposed between the tube and the slot. The curtain is equal in length at least to the height of the slot and is disposed on the chains and in relation to the scale in accordance with the position of the thermally sensitive element or control apparatus.

The upper sprockets 31, 31, are mounted on a shaft 33 journalled in the bracket 34 attached to the rear wall of the casing by screws 35. The lower sprockets 32, 32, are pinned to a drive and control motor driven shaft 36 journalled in a bearing bracket secured to the rear wall of the casing at the lower end thereof.

The curtain belt 29 which is drawn up and down longitudinally and in front of the tube has its respective ends secured to the chain by means of a cross pin 37, the end of the belt which may be fabric including a seam 38 through which this cross pin is inserted. The outer ends of the cross pin form the connection for certain of the links of the chain. It will be noted that the upper bracket 34 is adjustable for tightening the chains for drawing the curtain into taut condition, this adjustment being accomplished by virtue of vertical slots 39 in the upper bracket through which the attaching screws 35 pass.

A motor 40 is provided for driving the lower sprocket gears 32, 32. This motor is mounted upon the back plate member 41 of the casing. Any suitable motion reducing transmission may be interposed between the motor and the shaft on which the sprocket gears are mounted. A pinion 42 is mounted on the motor shaft 43 driving a large gear 44 mounted on a shaft 45 having a small pinion 46 secured thereto, which small pinion 46 drives a large gear 47 mounted on a shaft 48 having a small pinion 49 secured thereto which drives a large gear 50 mounted upon the shaft 36 which carries the sprocket gears 32, 32. The driven end of the shaft 36 is journalled in bearing plates 51 secured to blocks 52 attached to the back plate of the casing by means of screws 53. These plates carry the transmission shafts 45 and 48. A U-shaped brace or cross strap 54 is secured to the plates at their outer ends for stabilizing the bearing structure of the gears.

The gear train just described constitutes a motion reducing mechanism providing slow motion of the sprocket gears. The shaft between the driving gear 50 thereof and the sprocket gears 32, 32, is screw-threaded as at 55 for control purposes. A thermally sensitive arm 56 comprising two lengths of dissimilar metal fastened together is mounted at one end on a block 57 (see Figure 10) by means of two plates 58, one on either side of the thermally sensitive arm and screws 59 passing through plates 58 and the thermally sensitive arm and into the block.

The free end of the thermally sensitive arm 56 extends past the screw-threaded portion 55 of the drive shaft transverse to the shaft or substantially at right angles thereto. A contact plate 60 is provided as an extension of the thermally sensitive arm being secured thereto by means of a connecting strip 61 of insulating material and attachment elements 62. An electric wire 63 is connected to the extended contact element 60 by means of the attaching element 62 securing the same to the connecting plate. This wire extends along the side of the thermally sensitive arm and is connected to a supply terminal. This contact element or extension is provided with oppositely disposed contacts 64, 64, one at either side thereof in axial alignment.

A swinging contact carrier arm 65 has one end pivoted to the block 57 upon the outer face thereof and extends substantially parallel to the thermally sensitive arm. The free end of this strap carries a block 66 loosely attached thereto by means of a screw 67 passing through the arm and block. The screw passes through a slot 68 in the arm to permit slight longitudinal movement of the strap relative to the block as swinging motion takes place at its pivot point. This block 66 is a travelling block traversed by the screw-threaded portion of the drive shaft, whereby rotation of the drive shaft moves the block along the shaft and swings the pivoted contact carrying arm 65.

The outer end of this arm 65 carries a contact support 69 comprising a base plate 70 secured to the end of the strap by means of a screw 71 and side plates 72 of insulating material which are secured to the base plate by attaching elements. These side plates are disposed, one on each side of the contact plate or element or extension 60 at the end of the thermally sensitive arm. Each of these side plates carries a contact screw 73, these contact screws being in axial alignment and in axial alignment with oppositely facing contacts 64, 64, of the extended contact element.

Electric leads 74, 74, extend from these contacts to the motor. For a specific disclosure of the wiring arrangement, reference may be made to Figure 12. Inasmuch as alternating current is more available than direct current, the present disclosure is made in relation to alternating current. Referring to the wiring diagram, two input terminals 75, 75, are provided, one of which is the one previously mentioned connected by means of the wire 63 to the end of the thermally sensitive arm, in other words, the contact thereof. A resistance 76 is inserted in this wire.

The other input terminal 75 is connected to the armature 77 of the alternating current motor by means of a wire 78. The other armature terminal of said alternating current motor is connected to both contacts of the member disposed on the end of the strap by means of wires 79, 79. Each connection however is made through one field winding 80 of the alternating current motor so that the closing of the circuit by reason of one of the contacts from the thermally sensitive member touching either contact carried by the contact carrier arm closes the circuit through the motor armature and one of the field windings. Accordingly, when the thermally sensitive member contacts on one side, the closing of the circuit causes the motor to revolve in one direction, and contact on the other side causes the motor to revolve in the reverse direction.

The screw thread of the shaft is so arranged in regard to these connections that the closing of the circuit to the motor moves the contact block 66 in the direction tending to disestablish the contact and open the circuit. For the purpose of decreasing the sparking of the contacts, two small condensers 81, 81, are disposed between the input terminal and each field winding being connected, in other words, in each instance in parallel with the motor armature.

In operation, the thermally sensitive arm 56 assumes a given position for a given temperature of the environment. If the lower end of the curtain 29 is not in a corresponding position relative to the scale for indicating this temperature, one of the contacts 73, 73, on the end of the swinging carrier arm is touched by one of the contacts 64, 64, on the end of the thermally sensitive member. This starts the motor and through the reduced motion mechanism rotates the sprocket gears and adjusts the curtain to the appropriate position for establishing its lower edge relative to the scale to provide a reading corresponding to the temperature.

This rotation of the motor also moves the swinging arm and the contact is disestablished and the circuit broken when the curtain lower edge has reached the proper position. If the temperature continues to change in the same direction, the thermally sensitive member moves, reestablishes the contact and operates the motor to move the indicator and disestablish the contact. If the temperature changes in the opposite direction the thermally sensitive arm moves in a reverse direction, touches the other contact and operates the motor in the reverse direction to move the curtain in a reverse vertical direction, and as in the other instance when the contact is broken the indicator shows the proper temperature reading on the scale.

By the present improvement the visibility of the temperature indicating or display device has been greatly increased. The use of a gas filled electric light tube provides the respresentative rise and fall of the conventional fluid, it being apparent that any coloring of gas can be used which is available such as red, blue, green, etc. The representation of the rising and falling fluid or mercury column is more brilliant and striking than the fluid column for the reason that the gas in the tube is highly luminescent and provides a color glow which can be seen for great distances. It is of course obvious that a brilliant white light can be thrown on the scale as shown by means of electric lights 82, 82, at the top or bottom of the scale in reflector casings 83, 83. The curtain is of course thick enough to completely obliterate the light completely hiding the same from view and providing a sharp line at which the temperature reading can be taken on the scale. The whole intent and purpose of the improvement is to provide a large temperature display device simulating the true thermometer and which can be read in the same manner as the existing and conventional thermometer, but one which because of its structure is more easily read because of sharp contrast and the use of light.

Having described my invention, I claim:

1. A large temperature display device, comprising, a scale element, a luminescent light tube disposed along the graduations of said scale, a curtain having a lower end movable longitudinally of and between said scale and said tube, means for movably supporting said curtain, a motor for operating said means for raising and lowering said curtain, and a thermostat adapted to control the operation of said motor for adjusting the curtain lower edge relative to said scale for displaying the temperature of the environment of the thermostat.

2. A temperature-indicating apparatus of the nature disclosed, comprising, a large scale dummy thermometer, structure including a panel carrying the conventional temperature degree scale, a luminescent tube, a floating curtain adapted to conceal the tube above temperature registration, and a thermally sensitive element automatically translating its movement to the curtain for disposing the curtain relative to the scale.

3. A temperature-indicating apparatus of the nature disclosed, comprising, a large scale dummy thermometer structure including a panel carrying the conventional temperature degree scale, a luminescent tube, a floating curtain adapted to conceal the tube above temperature registration, a thermally sensitive element automatically translating its movements to the curtain for disposing the curtain relative to the scale, and means for relatively illuminating the panel in contrasting color to the light.

4. A temperature display device, comprising, a scale carrying temperature readings, an elongated lighting device disposed along said scale, a curtain disposed between said device and said scale and adapted to conceal a portion of the elongated lighting device and to be moved relative to the scale, and a thermally sensitive apparatus for moving said curtain.

5. A large temperature display device, comprising, a casing bearing a temperature scale, a luminescent tube disposed along said scale, a flexible curtain belt disposed between said scale and said light tube and having a lower edge movable in relation to the indications on the temperature scale, rollers supporting said curtain belt, a motor, reduced motion mechanism connecting said motor and one of said rollers, and a thermostat adapted to control the rotation and counter-rotation of said motor to adjust the indicator on said scale to register the temperature of the environment.

6. A large temperature display device, comprising, a casing bearing a temperature scale on its forward face and including a longitudinal slot in its forward face, a light tube disposed within the casing along the scale directly in back of the slot, a curtain belt mounted in back of the slot and in front of the light and having a lower end movable along the slot and relative to the graduations on the temperature scale, rollers movably supporting said curtain belt, and a thermally controlled driving device for moving said curtain belt for adjusting the lower edge thereof relative to the graduations of the scale.

7. A temperature display apparatus of the nature disclosed, comprising, a large casing structure including a panel carrying the conventional temperature degree scale, a luminescent tube of elongated cross section, said tube frosted for the purpose of diffusing the light and providing a wide indicator column of light, a floating curtain adapted to conceal the light illumination above temperature registration, and a thermally sensitive element automatically translating its movements to the curtain for disposing the curtain lower edge relative to the scale.

CHARLES R. PALMER.